April 25, 1944.  A. C. PURPURA  2,347,611
TOASTER
Filed Aug. 6, 1941    2 Sheets-Sheet 1
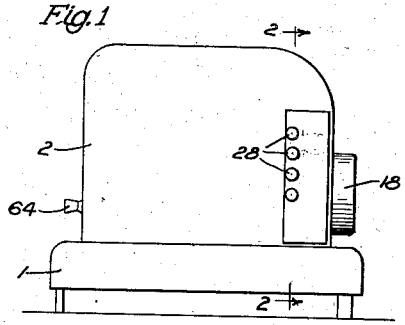
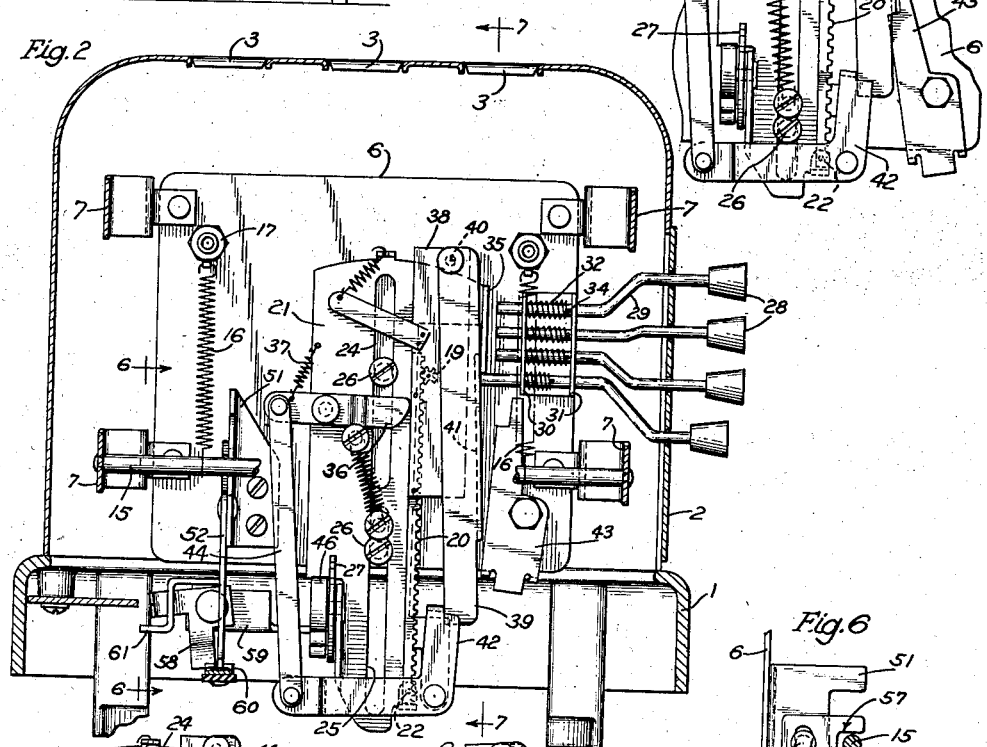
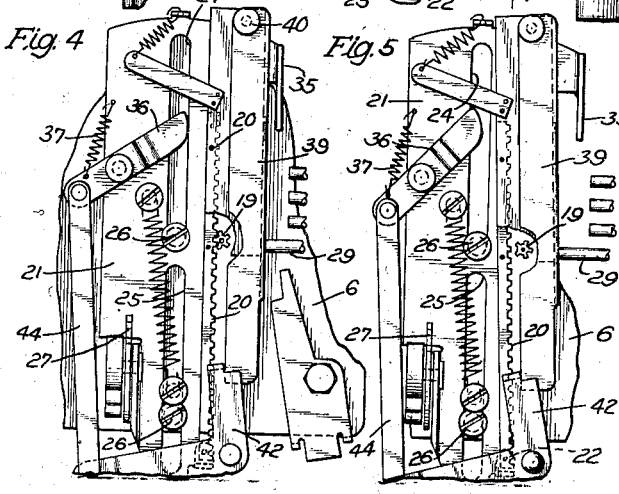
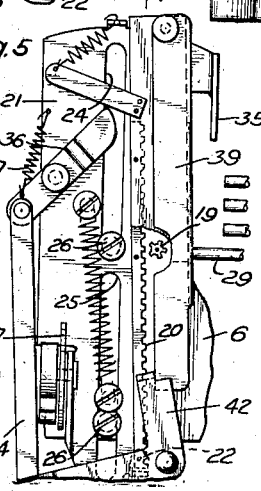
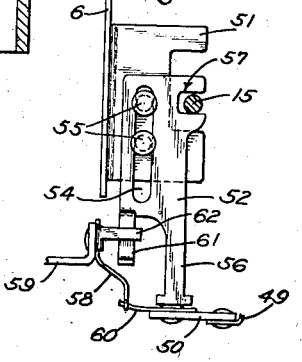
Inventor:
August C. Purpura
BY
Wm. F. Freudenreich
Atty.

April 25, 1944.  A. C. PURPURA  2,347,611
TOASTER
Filed Aug. 6, 1941  2 Sheets-Sheet 2
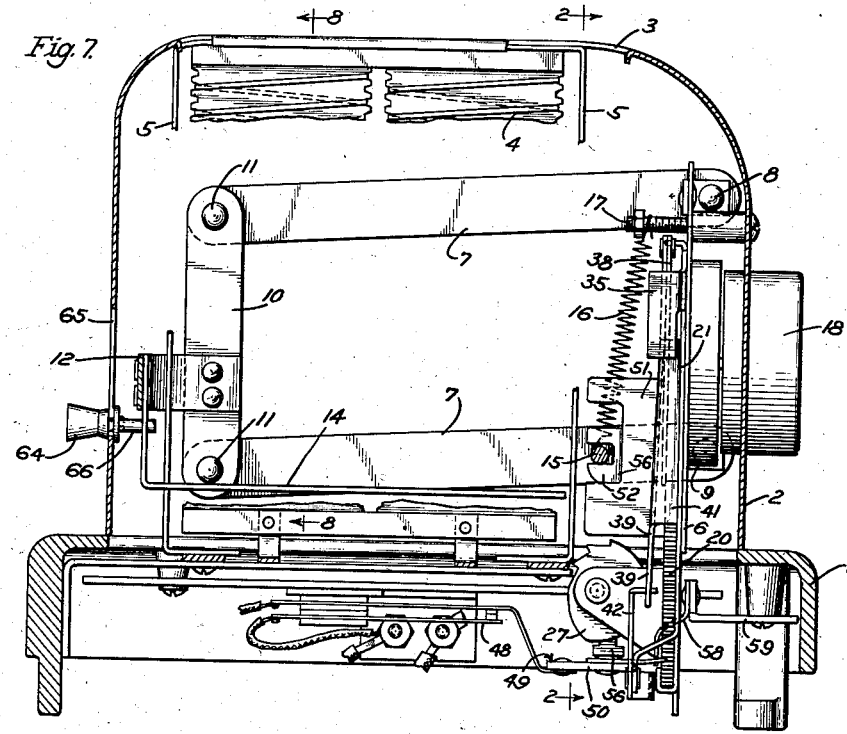
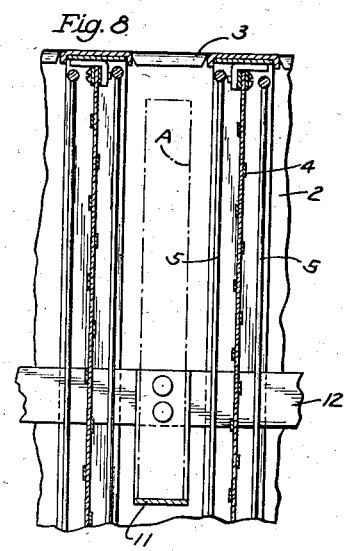
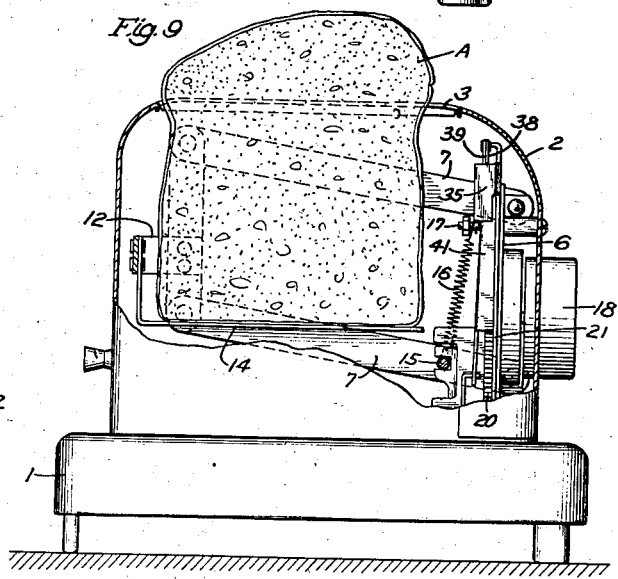
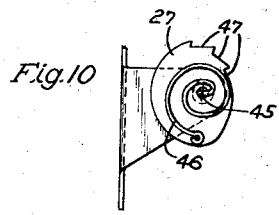
Inventor.
August C. Purpura
By
Wm F. Freudenreich,
Atty.

Patented Apr. 25, 1944

2,347,611

UNITED STATES PATENT OFFICE 2,347,611

TOASTER

August C. Purpura, Chicago, Ill., assignor to Chicago Flexible Shaft Company, Chicago, Ill., a corporation of Illinois Application August 6, 1941, Serial No. 405,641

12 Claims. (Cl. 99—335)

The present invention has for its object to produce a simple and novel cooking apparatus, specifically a toaster, which shall be of simple and durable construction, reliable and efficient in operation, and require a minimum of effort and attention on the part of the user in the operation thereof.

In carrying out my invention, I provide means whereby all of the energy for moving the toast holder between toasting and receiving positions is supplied by an electric power device, usually a motor, so that, in one of its aspects, the present invention may be said to have for an object to reduce the amount of effort that need be exerted by the user during any toasting cycle to that required to insert the bread and move some little controlling element.

In the preferred form the power is supplied by a constant speed or synchronous motor. Viewed in further of its aspects, the present invention has for its object to utilize such motor as a timing device.

In order to make possible a selective type of toasting, such as toasting bread of the same kind to different shades of brown or bread of any degree of moisture content or freshness to any extent desired, it is necessary that the timing device of the toaster be variable. A further object of the present invention is to make it possible to bring about variable timing by controlling in a simple way the number of revolutions which the motor makes while the toast remains in the toasting position.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a toaster embodying the present invention; Fig. 2 is a section, on a larger scale, on lines 2—2 of Figs. 1 and 7, showing the parts of the apparatus in position for toasting; Fig. 3 is a view similar to Fig. 2, showing only a part of the mechanism, with the various elements in the positions which they occupy when the toast holder is in its raised or receiving position; Fig. 4 is a view similar to Fig. 3, showing a condition which exists momentarily when one of the control buttons is first pushed in and before the toast holder has started to drop; Fig. 5 is a view similar to Figs. 3 and 4, showing the positions of the elements at the instant when the motor is disconnected from the holder and after which the holder drops down to bring the parts into the position shown in Fig. 2; Fig. 6 is a section on line 6—6 of Fig. 2, showing the controlling switch and immediate operating means; Fig. 7 is a section taken approximately on line 7—7; Fig. 8 is a section on line 8—8 of Fig. 7, showing only a fragment of the toaster; Fig. 9 is a view similar to but on a larger scale than Fig. 1, with portions of the toaster broken away to expose the interior, the toast holder being in its raised or receiving position and containing a piece of bread; and Fig. 10 is a detail illustrating a thermostatic compensator for variations in temperature of the toaster.

Referring to the drawings, 1 represents a suitable hollow base above and upon which is mounted a suitable casing 2. The top of the casing is provided with as many openings as the number of pieces of bread which it may be desired to toast simultaneously. In the particular arrangement illustrated, there are three of such openings 3, so that the holder for the bread is wide enough to underlie all three of the openings. Any usual or suitable heating elements 4, provided with their wire guides 5, are supported from the base within the casing in operative relation to the openings or slots in the top of the casing.

As will be seen, the casing is substantially longer than the width of a piece of toast so as to provide room in one end, beyond the vertical edges of the toast for the controlling mechanism, all of which is mounted upon a stationary vertical plate 6. The holder consists of two pairs of flat bars 7 arranged within and at opposite sides of the casing. These bars extend lengthwise of the casing, namely in planes at right angles to the plate 6, and each is hinged at one end to this plate. One bar of each pair is hinged to the supporting plate near the top of the latter, as indicated at 8, while the other is hinged to the plate toward the bottom, as indicated at 9. The free ends of the bars of each pair are connected together by a vertical link 10, the connecting pins 11 for which are spaced apart the same distance as are the hinge axes of the hinges between the arms and the supporting plate. Therefore, when the bars are swung up and down, the links 10 remain upright. The links 10 are connected by a stiff bow-shaped bar 12 set on edge; this bar carrying the actual supports for the toast. In the arrangement shown, the actual supports for the toast are in the form of long L-shaped members 14 each of which directly underlies one of the openings or windows in the top of the casing; the short arm of each L being vertical and being fixed at its upper end to the bar 12, while the long arm extends horizontally clear through the heating zone.

In Fig. 9 the toast holder is shown in its raised or receiving position, with a piece of toast A resting upon one of the L-shaped supports and projecting up through one of the slots or windows above the top of the casing. Fig. 2 represents the toasting position of the holder, the arms extending laterally and downwardly from their hinge points instead of laterally and upwardly, as in Fig. 9. Extending between the two lower arms 7 of the toast holder, not far from the plate 6, is a rod 15. A tension spring 16 is connected at one end to the rod 15 and extends upwardly and is fixed to a projection 17 on and near the upper edge of the supporting plate 6; this spring serving partly to counter-balance the toast holder, but mainly as a cushioning device to absorb the shock when the toast holder drops down. When free to do so, the holder drops down by gravity, while the lifting thereof is done by motor-driven means engaging with the rod 15.

A suitable electric motor 18 is mounted on the end wall of the casing adjacent to the supporting plate 6, and its shaft extends through and beyond this plate and has mounted thereon a small pinion 19. This pinion cooperates with a long vertical rack bar 20 which lies in front of and is hinged at its lower end to a vertically-slidable plate 21, as indicated at 22. The plate 21 contains two elongated vertical slots 24 and 25 through which extend headed studs or screws 26 that project forwardly from the support 6. This connection with the support 6 permits the plate 21 to move upwardly and downwardly while being prevented from moving relatively to the support in other directions. The plate or slide 21 carries a part 27 that underlies the rod 15 and is adapted to engage with the same when the slide is raised, and thereby swing the toast holder up. The parts are so proportioned that when the slide is down, as shown in Fig. 2, the part 27 mounted thereon lies at some distance below the rod 15, so that the slide must move up a predetermined distance before it has any effect on the toast holder. By arresting the downward movement of the slide at different points, the time that elapses during a subsequent lifting movement of the slide, before it begins to raise the toast holder, may be varied within any desired limits.

Each toasting cycle is started by permitting the slide 21 to drop down from its raised position, this being under the control of a vertical row of push buttons 28 arranged on the exterior of the casing and having stems 29 that extend through the end wall of the casing and through a pair of spaced ledges 30 and 31 fixed to the front face of the supporting plate 6. Each of the stems 29 is surrounded by a coil spring 32 which engages at one end with the ledge 30 and at the other end with a pin 34 projecting from the stem. The parts are so proportioned that the springs 32, being under an initial compression, tend constantly to hold the stems retracted as are the upper three stems in Fig. 2. The stems 29 are arranged in a vertical plane in front of and parallel to the supporting plate 6. The slide 21 has at the top, along the edge nearest the inner ends of the stems 29, a short forwardly-projecting flange 35 which, when the slide is up, stands far above the uppermost stem, as shown in Fig. 3. The parts are so proportioned that whenever one of the push buttons is pressed in, while the slide is up, the inner end of its stem is forced into the path of the lower edge of the flange 35 when the slide moves down. It will thus be seen that the slide being in its raised position and being allowed to drop, its downward movement can be arrested at any one of four different points, depending upon which of the push buttons is pressed in.

When the motor not only lifts the slide but serves to support it in its raised position, as in the arrangement illustrated, it is necessary to disconnect the motor from the slide in order to permit the latter to drop. This can conveniently be accomplished by pushing the rack bar 20 away from the pinion 19. In the arrangement shown, there is a pivoted dog 36 mounted on the slide behind the rack bar, namely on the opposite side from that on which the pinion is located. Normally, this dog is held in engagement with the smooth rear edge of the rack bar, while standing at about right angles thereto, by a spring 37. As long as this dog remains in its horizontal position, the rack is held in mesh with the pinion but, upon swinging the dog clear of the rack bar, the rack bar itself may be swung away from the pinion far enough to be out of mesh with the latter. This dog is caused to swing into its release position by the act of pressing one of the push buttons. Fastened to the upper portion of the rack bar 20 is a long wide plate or vane 38 that extends almost to the flange 35. Lying in front of this plate is a long arm 39 hinged thereto at its upper end, as indicated at 40. This arm is provided at the edge farthest away from the rack bar with a flange 41 continuing throughout the greater part of the length thereof and into the path of the stems on which the push buttons are carried. Consequently, if, when the slide is up, as shown in Fig. 3, one of the push buttons is pressed, say, the lower one, its stem engages with the flange on the arm 39, as shown in Fig. 4, and swings the arm slightly toward the rack bar. This swinging movement causes the lower end of the arm to engage with the upwardly-projecting arm of a bell crank lever 42 pivoted to the lower end of the slide and having its other arm connected to the dog 36 by a link 44. The result is that the dog is swung in the counter-clockwise direction, as viewed in Fig. 4, thus carrying it clear of the rack bar. During this preliminary movement of the push button, the arm 39 is freed from a rocking supporting dog 43 which normally underlies the lower end of the flange 41 and supports the slide 21 and the parts carried thereby, independently of the motor or rack bar; the dog automatically swinging into holding position when the slide is raised from a lowered toasting position. A further inward movement of the stem 29, as indicated in Fig. 5, results in a lateral pressure of the flange 41 against the edge of the vane on the rack bar and the pushing of this bar laterally until it is out of mesh with the pinion. The slide is now without connection with the motor and can therefore descend freely. As heretofore stated, it will descend only until the flange 35 on the slide engages with the stem 29 that has been pushed in, namely with the lowermost stem when it is the lowermost push button that has been operated. This final condition is illustrated in Fig. 2. As soon as the pressure on the push button is released, the spring 37 that acts on the dog 36 comes into play, rocking the bell crank lever in the clockwise direction, as viewed in Figs. 5 and 2, causing the upper arm of the bell crank lever to push the arm 39 away from the edge of the vane on the rack bar and causing the dog to force the rack bar laterally into engagement with the pinion. This action takes place before the push button reaches its idle position so that the flange 35 on the slide engages the stem of the push button that was pressed in, as illustrated in Fig. 2, after the rack bar has been freed from the pinion and before it is again engaged with the latter. In this way, a driving connection may be effected between the slide and the motor in any one of four different positions of the slide, depending upon which of the push buttons is operated. Obviously, the farther down that the slide goes, before the driving connection with the motor is restored, the longer it will take the motor to move the slide up again to the normal raised position, thus providing the means for timing the duration of any toasting period because it will take longer for the part 25 to move up into engagement with the rod 15 when the control is through the lowermost push button than when any one of the other buttons is operated.

The part 27 which, through direct engagement with the rod 15, serves to lift the toast holder to its upper or receiving position, is shown as taking the form of a mutilated disk loose on a stationary pin or axle 45, as can best be seen in Fig. 10, and normally held in a predetermined angular position by a spiral, bi-metallic element 46; one end of this element being fixed to the part 27 and the other being anchored to the pin or axle. As the temperature of the toaster varies, the resulting expansion or contraction of the bi-metallic, thermo-responsive element 46 causes a turning movement of the part 27 in one direction or the other, depending upon whether the temperature of the toaster has been increased or decreased. The edge of that portion of the part 27 that is at the top, namely directly above the supporting pin or axle, at one time or another during the shifting movements of the part 27 under temperature changes, has a step formation, as indicated at 47; the tread portions of the steps lying at different radial distances from the pin or axle. When the step that is farthest from the pin or axle is at the top, as it is in Fig. 10, the slide will act on the rod 15 after travelling upward a shorter distance from any of its several toasting working positions, than is the case when one of the steps nearest the pin or axle is at the top. Therefore, the time during which a piece of toast need remain in the toaster is controlled so that uniform toasting will result, regardless of differences in the temperature of the toaster. Although the step formation on the part 27 is advantageous, in that it always provides a flat face of substantial length which may have sliding contact with the rod 15, during the upward movement of the toast holder, the edge of the mutilated portion of the disk may, of course, be simply cam-shaped.

In order to carry out automatically a toasting cycle upon the manipulation of one of the push buttons, it is necessary that the motor circuit be properly controlled. In the arrangement shown, the motor circuit is closed whenever the toast holder is in its lowered position and is again opened when the holder reaches its raised, idle or receiving position. To this end there is mounted within the chamber on the under side of the base a switch 48 provided with a long resilient arm 49 provided at its free end with a stiff piece of insulating material 50 which is substantially horizontal. When free to do so, the arm 49 swings up and opens the switch. On the front side of the vertical supporting plate 6 is a stationary bracket 51 against which lies a vertical switch actuating plate 52. As best shown in Fig. 6, the part 52 is provided with a long vertical slot 54 through which extend a pair of headed pins 55 that are fixed to the bracket. The parts are so proportioned that a foot portion 56 on the member 52 may engage with the end piece 50 of the movable switch arm before the member 52 drops down as far as the pin and slot connection will permit. In the front edge of the member 52 is a notch 57 in which the rod 15 of the toast holder lies. Therefore, as the toast holder moves up and down, it gives corresponding movements to the switch actuating member 52. In other words, when the toast holder moves down, it closes the switch when the toast holder reaches its toasting position; and, when the toast holder moves up, the switch actuator is carried along with it. However, since it is necessary that the motor be kept running until the toast holder has been brought into its idle or receiving position, the switch must remain closed until the toast holder is up. I have therefore provided a swinging dog 58 pivotally mounted on a bracket 59 within the base which, when left free to do so, swings into position overlying a little finger 60, projecting from the part 50 of the switch arm, at times when the switch is closed. With this arrangement, whenever the switch actuator 52 moves down into its switch-closing position, as illustrated in Fig. 6, the locking dog 58 swings into position to hold the switch closed until the dog is tripped. The tripping of the dog 58 is brought about by the engagement of a finger 61 bent laterally from the part 52 and underlying a projection 62 on the dog. The parts are so proportioned that when the switch holder is down, the finger 61 lies at a substantial distance below the projection 62 so that these two elements do not come into engagement with each other until the toast holder is at the upper limit of its movement. Therefore, although the switch arm is released from the actuator 52 as soon as the toast holder starts to ascend, the switch cannot open until the ascent is completed. Thereafter, the switch remains open until the actuator therefor is again moved down; this downward movement carrying the finger 60 far enough down to permit the dog 58 again to swing over the top of the same and serve as a lock.

It will be seen that the time spent in lifting the toast holder is always the same, regardless of how far the slide 21 is lowered, because it always begins at the time when the lifting member 27 rises high enough to engage with the rod 15, regardless of how far it had to travel to get there.

If it be desired to lift the toast holder manually, this may be done by means of a button 64 slidable up and down in a vertical slot 65 in the front end wall of the casing. As best shown in Fig. 8, this button has a stem 66 that extends inwardly underneath the cross bar 12 of the holder unit so that, upon moving the button up, the toast holder is raised independently of the power-operated mechanism.

In the use of the apparatus, the holder for an article to be toasted or otherwise cooked being up and the apparatus having been plugged into an electric circuit, such an article is inserted in the holder and that push button which corresponds to the desired type of toasting or other cooking is pressed in. This causes the main slide 21 to be released from the motor and to drop into toasting position, as heretofore explained. As the holder and the main slide reach their "down" positions, the driving connection between the slide and the motor is again made and the switch is closed, causing the motor to start and the heating elements to be energized. The motor must make a predetermined number of turns before the lifting means for the holder begins to act on the holder. Thus the motor, as does the motor in an electric clock, constitutes an accurate timing device and the cooking time is accurately measured for any given temperature of the apparatus. If the apparatus is cold at the time the cycle is started, the compensating thermoresponsive device lengthens the cooking time beyond that which may be regarded as the normal time with a hot apparatus. At the end of the predetermined cooking period, the holder is raised into its delivery and receiving positions and the motor and the heater are deenergized; the dog 43 locks the main slide and the holder in their "up" positions; and everything is ready to receive a new piece of bread or other article to be toasted or otherwise cooked.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A cooking apparatus comprising a holder for an article to be cooked movable back and forth between a cooking position and a receiving position; said holder tending constantly to move toward and remain in the cooking position; an electric motor to move the holder from the cooking position into the receiving position at a speed proportionate to the speed of the motor; and manually-controlled means to render the motor inoperative to restrain the holder from moving to its cooking position and, a predetermined, variable time after the holder reaches the cooking position, to cause the motor to act on the holder to return it to its receiving position.

2. A cooking apparatus comprising a holder for an article to be cooked movable back and forth between a cooking position and a receiving position; said holder tending constantly to move toward and remain in the cooking position; a motor to move the holder from the cooking position into the receiving position; a plurality of manually-operable control devices; and means under the control of said devices to render the motor inoperative to restrain the holder from moving to its cooking position and to cause the motor to return the holder to its receiving position a variable predetermined time after the holder reaches the cooking position, depending upon which of said control devices is operated.

3. A cooking apparatus comprising a holder for an article to be cooked having capacity for up and down movements; a power device to raise the holder; and manually-controlled means including a series of independent manually operable push buttons to release the holder and leave it free to move downward by gravity and, after the holder is down, for a variable period determined by the push button that is selected, render the power device operative to raise it again.

4. A cooking apparatus comprising a holder for an article to be cooked having an up and down movement; electrically-operated means to raise the holder; and manually controlled means including a series of independent manually operable push buttons to release the holder from the aforesaid means and leave it free to move downward and, after the holder is down, for a variable period determined by the push button that is operated, again make the electrically-operative means operative to raise the holder.

5. A cooking apparatus comprising a holder for an article to be cooked having capacity for up and down movements; an electric motor to raise the holder; manually-controlled means to release the holder from the motor and leave it free to move downwardly by gravity; and means controlled by the holder to deenergize the motor when the holder is up and energize it when the holder is down.

6. In a cooking apparatus, a holder for an article to be cooked movable between cooking and idle positions, a time-measuring device that moves said holder from its cooking position into its idle position; means to cause said device to begin to operate when the holder reaches its cooking position, to stop when the holder reaches its idle position, and to operate for a predetermined interval of time, after starting, before producing any movement in the holder; and a device responsive to temperature changes in said apparatus to vary the length of said predetermined interval of time.

7. A cooking apparatus comprising a holder for an article to be cooked movable back and forth between a cooking position and a receiving position; said holder tending constantly to move toward and remain in the cooking position; a motor to move the holder from the cooking position into the receiving position; manually-controlled means to release the holder from the motor and permit the holder to move into its cooking position and, a predetermined time after the holder reaches the cooking position, to effect a driving connection between the motor and the holder to cause the motor to return the holder to its receiving position; and a thermoresponsive device acting on said means to vary said predetermined time to compensate for temperature changes in said apparatus.

8. A cooking apparatus comprising a holder for an article to be cooked having capacity for up and down movements between a cooking position and an idle position; electrically-operated means to raise the holder; manually controlled means to release the holder from the aforesaid means and leave it free to move downward and, a variable predetermined interval of time after the holder is down, again make the electrically-operative means operative to raise the holder; and a device responsive to the temperature of the apparatus acting on said means further to vary said interval of time.

9. A cooking apparatus comprising a holder for an article to be cooked having capacity for up and down movements between a cooking position and an idle position; an electric motor to move the holder up into its idle position at a speed proportional to that of the motor; manually-controlled means to release the holder from the motor and leave it free to move downwardly by gravity through variable predetermined distances; and means controlled by the holder to deenergize the motor when the holder is up and energize it when the holder is down.

10. In a cooking apparatus, a stationary member, a horizontal support for a piece of toast, a jointed parallelogram device hinged to said member at one end and supporting said support for the toast from the other end so as to maintain it horizontal in all angular positions of said device, a vertically-movable slide having a part adapted to engage said device and swing it up when said slide rises, a motor, and means to connect the motor to the slide to raise it and disconnect it to permit the slide to drop by gravity.

11. In a cooking apparatus, a work holder movable up and down between a cooking position and an idle position, a holder lifting means including a vertically movable member and a series of manually-operable stops to arrest the downward movement of said member at any one of a plurality of points, a device constituting a timer and a motor; and means controlled by said stops to effect a driving connection between said member and said device when said holder reaches the cooking position and said member is in one of its down positions and to interrupt said driving connection, upon the manipulation of one of said stops while the holder is in its idle position and the said member is up.

12. In a cooking apparatus, a work holder movable up and down between a cooking position and an idle position, a vertically movable member having an element adapted to engage a part on the holder to raise the latter when said member is raised, a plurality of manually-operable stops to arrest downward movements of said member at any one of a plurality of points in each of which said element is spaced a substantial distance away from the cooperating part on the holder, a motor; and means controlled by said stops to connect it to and disconnect it from the said member in a manner to permit both the holder and said member to drop and then to be automatically raised.

AUGUST C. PURPURA.